Patented Nov. 18, 1941

2,263,018

UNITED STATES PATENT OFFICE 2,263,018

POLYMETHINE DYE INTERMEDIATE

Robert H. Sprague, Rochester, N. Y., assignor to Eastman Kodak Company, Rochester, N. Y., a corporation of New Jersey No Drawing. Application January 7, 1941, Serial No. 373,463

18 Claims. (Cl. 260—240)

This invention relates to polymethine dye intermediates and to a process for preparing them.

It is known that merocyanine dyes containing the following grouping:

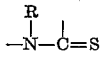

(R represents alkyl or aryl) can be quaternarized with alkyl salts to give polymethine dye intermediates containing the following grouping:

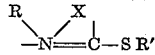

(R represents alkyl or aryl and R' represents alkyl).

It is also known that the aforesaid polymethine dye intermediates can be reacted with cyclammonium quaternary salts containing a reactive methyl group to give complex polymethine dyes. Moreover, it is known that the aforesaid polymethine dye intermediates can be reacted with organic compounds containing a ketomethylene group to give still other complex polymethine dyes.

I have now found that the condensation products of the aforesaid polymethine dye intermediates and malonic esters, can be hydrolyzed to give new polymethine dye intermediates containing the following grouping:

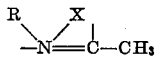

These new polymethine dye intermediates, I have found, can be employed to prepare complex polymethine dyes of a kind heretofore unavailable.

It is accordingly an object of my invention to provide new polymethine dye intermediates and a process for preparing the same. It is a further object to provide a process for preparing complex polymethine dyes. A further object is to provide complex polymethine dyes. Other objects will become apparent hereinafter.

In accordance with my invention, I hydrolyze, in the presence of an acid, a condensation product of the following general formula:

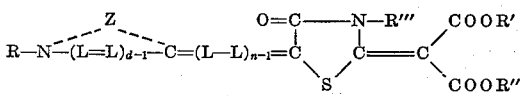

wherein L represents a methine group, $d$ represents a positive integer of from one to two, $n$ represents a positive integer of from one to three, R, R' and R'' each represent an alkyl group, such as methyl, ethyl, n-primarybutyl, β-ethoxyethyl and benzyl for example, R''' represents a member selected from the group consisting of alkyl and aryl groups, such as a methyl, an ethyl, a phenyl or a naphthyl group for example, and Z represents the non-metallic atoms necessary to complete a heterocyclic organic nucleus, for example (when $d$ represents one) a five-membered nucleus, such as an oxazole nucleus (e. g. 4-methyloxazole, 4-phenyloxazole, benzoxazole or naphthoxazole), a thiazole nucleus (e. g. 4-methylthiazole, 4-phenylthiazole, benzothiazole or naphthothiazole), a selenazole nucleus (e. g. 4-methylselenazole, 4-phenylselenazole or benzoselenazole), a thiazoline nucleus, or a six-membered nucleus, such as a pyridine or a quinoline nucleus, and, when $d$ represents two, a six-membered nucleus, such as a pyridine or a quinoline nucleus.

Hydrochloric acid is advantageously employed in practicing my invention. Mineral acids are especially suitable for the practice of my invention, sulfuric, phosphoric and hydrobromic acids being further examples of acids which can be employed. Heat accelerates the hydrolysis.

The following examples will serve to illustrate the manner of practicing my invention.

EXAMPLE 1.—5 - (3 - ethyl - 2(3) - benzothiazolylidene) -2-methyl-4(5) -thiazolone ethiodide

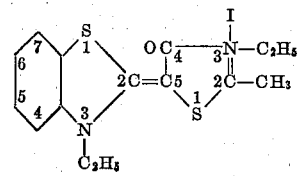

4.0 g. (1 mol.) of 2-dicarbethoxymethylene-3-ethyl -5-(3-ethyl -2(3) -benzothiazolylidene) -4-thiazolidone were placed in 50 cc. of 15% hydrochloric acid. The mixture was boiled, under reflux, for 30 minutes. Carbon dioxide was evolved and the mixture took on a pale yellow color. The undissolved solid which remained after the boiling was filtered off, using a sintered glass filter. The filtrate was concentrated nearly to dryness under reduced pressure. The yellow crystals which separated were dissolved in 20 cc. of absolute ethyl alcohol, an excess of sodium iodide dissolved in methyl alcohol was added, and the resulting mixture was chilled to 0° C. The crystals were filtered off, washed with acetone, then the water and finally dried in the air. After recrystallization from methyl alcohol, the product was obtained, in 36% yield, as yellow crystals, melting at 217° to 220° C. with decomposition.

The dicarbethoxymethylene compound used above was prepared as follows: 13.2 g. (1 mol.) of 5-(3-ethyl-2(3)-benzothiazolylidene) -2 - methylmercapto-4(5)-thiazolone ethiodide, 8.0 g. of diethyl malonate and 2.5 g. (1 mol.) of triethylamine were placed in 50 cc. of absolute ethyl alcohol. The mixture was boiled, under reflux, for 30 minutes. The yellow crystals which separated slowly from the boiling mixture were filtered off (after chilling the mixture), washed with methyl alcohol and dried in the air. Yield 9.8 g. (87%). After several crystallizations from acetone (71 cc. per gram of crystals), the crystals melted at 172° to 174° C.

EXAMPLE 2.—*5 - [(3 - ethyl - 2(3) - benzoxazolylidene) ethylidene]-2 - methyl - 4(5) - thiazolone ethiodide*

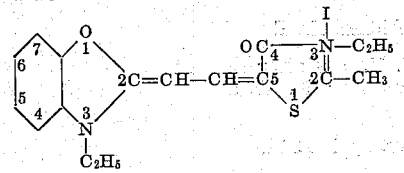

2.3 g. (1 mol.) of 2-dicarbethoxymethylene-3-ethyl - 5 - [(3 - ethyl - 2(3) - benzoxazolylidene) -ethylidene]-4-thiazolidone and 25 cc. of 18% hydrochloric acid were mixed together. The mixture was boiled, under reflux, for 15 minutes. There was a visible evolution of gas. The reaction mixture was concentrated to 10 cc. under diminished pressure. An excess of sodium iodide dissolved in methyl alcohol was added. The resulting solution was chilled to 0° C. and stirred. The red crystals which separated were filtered off, washed with water, then with acetone and finally dried in the air. After recrystallization from absolute ethyl alcohol (50 cc. per gram of crystals), the product was obtained, in 30% yield, as minute brown needles, with a bright reflex, and melting at 226° to 227° C. with decomposition.

The dicarbethoxymethylene compound used above was prepared as follows: 47.4 g. (1 mol.) of 5-[(3-ethyl-2(3)-benzoxazolylidene) ethylidene]-2 - methylmercapto - 4(5) - thiazolone ethiodide, 32 g. (1 mol.+100% excess) of diethylmalonate and 10.1 g. (1 mol.) of triethylamine were placed in 150 cc. of absolute ethyl alcohol. The mixture was boiled, under reflux, for 15 minutes. The resulting orange mixture was chilled to 0° C., the solid product filtered off, washed with methyl alcohol and dried in the air. After recrystallization from acetone (14 cc. per gram of solid), the product was obtained, in 30% yield, as bright orange needles, melting with decomposition at 193° to 194° C.

EXAMPLE 3.—*5-[(3-ethyl - 2(3) - benzothiazolylidene) ethylidene]-2 - methyl - 4(5) - thiazolone ethiodide*

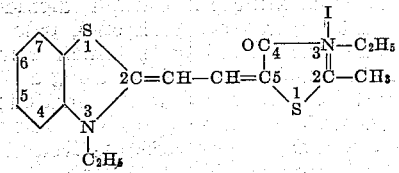

4.4 g. (1 mol.) of 2-dicarbethoxymethylene-3-ethyl - 5 - [(3 - ethyl - 2(3) - benzothiazolylidene) ethylidene]-4-thiazolidone were placed in 50 cc. of 15% hydrochloric acid. The mixture was boiled, under reflux, for 15 minutes. The resulting orange solution was concentrated under diminished pressure and chilled to 0° C. The crystals which separated were collected on a filter, washed with acetone and dried in the air. The product was dissolved in a small amount of methyl alcohol and treated with an excess of sodium iodide dissolved in methyl alcohol. The product which separated was filtered off and recrystallized from methyl alcohol (35 cc. per gram of product). It was obtained, in 53% yield, as dark red crystals, melting at 199° to 201° C. with decomposition.

The dicarbethoxymethylene compound used above was prepared as follows: 24.5 g. (1 mol.) of 5- [(3 - ethyl - 2(3) - benzothiazolylidene) ethylidene]-2-methylmercapto-4(5)-thiazolone ethiodide, 16 g. (1 mol.+100% excess) of diethylmalonate and 5 g.(1 mol.) of triethylamine were placed in 100 cc. of absolute ethyl alcohol. The mixture was boiled, under reflux, for 45 minutes. The resulting orange mixture was chilled to 0° C., the solid product filtered off and washed with methyl alcohol. After recrystallization from acetone (25 cc. per gram of product), the product was obtained, in 32% yield, as red crystals, melting at 185° to 187° C. with decomposition. In a similar manner, 2-dicarbmethoxy-methylene-3-ethyl - 5 - [(3 - ethyl - 2(3) - benzothiazolylidene) ethylidene]-4-thiazolidone, was obtained as red crystals, melting at 218° to 219° C. with decomposition.

EXAMPLE 4.—*5 - (3 - ethyl - 2(3)-benzothiazolylidene)-2 - methyl - 4(5) - thiazolone n - propyl chloride*

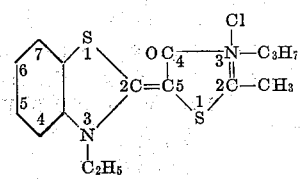

24.5 g. (1 mol.) of 2-dicarbethoxymethylene - 5 - (3-ethyl-2(3)-benzothiazolylidene)-3-n-propyl-4-thiazolidone were placed in 500 cc. of 15% hydrochloric acid. The mixture was boiled, under reflux, for 2 hours. Carbon dioxide was evolved. The resulting mixture was filtered, using a sintered glass filter, to remove some solid matter. The filtrate was evaporated to dryness under reduced pressure. The orange crystals thus obtained were stirred with 150 cc. of acetone. The acetone mixture was chilled to 0° C. and the crystals filtered off and dried in the air. 15.2 g. of crystals melting at 146° to 148° C. with decomposition were thus obtained.

The dicarbethoxymethylene compound used above was prepared as follows: 130 g. (1 mol.) of 5-[3-ethyl-2(3)-benzothiazolylidene-3-(n-propyl)]-rhodanine and 144 g. (1 mol.+100%) of methyl-p-toluenesulfonate were heated together in an oil bath at 165° to 170° C. for one hour. The reddish brown viscous mass was then cooled and washed, by decantation, several times with 200 cc. portions of absolute diethyl ether. The residue was placed in a one liter flask with 124 g. (1 mol.+100% excess) of diethyl-malonate, 38.6 g. (1 mol.) of triethylamine and 200 cc. of absolute ethyl alcohol. The mixture was boiled, under reflux, for one hour. The resulting orange solution was chilled to 0° C. and stirred to promote crystallization. The crystals were filtered off, washed with methyl alcohol and sucked nearly dry on the filter. The sticky orange crystals were purified by crystallization from methyl alcohol, (50 cc. per gram of crystals) and obtained, in 19% yield, as bright orange crystals, melting at 182° to 184° C. with decomposition.

In a manner similar to that illustrated in the above examples 5-(3-ethyl-2(3)-benzoselenazolylidene) -2-methyl-4(5) - thiazolone pheniodide; 5 - [(1 - ethyl - 1, 4-dihydroquinolylidine) ethylidene] - 2 - methyl - 4(5) -thiazolone ethiodide; 5- [(3-methyl-2(3)-thiazolinylidene) ethylidene]-2-methyl - 4(5) - thiazolone ethiodide and 5 - [(3-ethyl-2(3)-benzothiazolylidene) butenylidene]-2-methyl-4(5)-thiazolone ethiodide can be prepared.

My new intermediates can be condensed, to give polymethine dyes, with cyclammonium quaternary salts containing, in the alpha or gamma position, an acylated β-arylaminovinyl group or an acylated arylamino-1,3-butadienyl group. The condensations are advantageously effected in the presence of a basic condensing agent. The following examples illustrate the formation of such dyes.

EXAMPLE 5.—2-[3-(3-ethyl-2(3)-benzothiazolylidene)propenyl] - 5-[3-ethyl-2(3)-benzoxazolylidene)ethylidene]-4(5)-thiazolone ethiodide

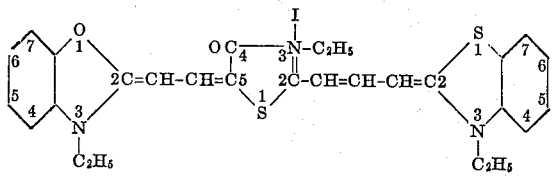

0.66 g. (1 mol.) of 5-[(3-ethyl-2(3)-benzoxazolylidene) ethylidene] - 2 - methyl-4(5)-thiazolone ethiodide and 0.7 g. (1 mol.) of 2-(β-acetanilidovinyl) - benzothiazole ethiodide were placed in 15 cc. of pyridine. The mixture was boiled, under reflux, for 5 minutes. The resulting green mixture was chilled to 0° C., diluted with 100 cc. of diethyl ether and stirred. A sticky green solid separated. The ether was decanted and the residue was stirred with 15 cc. of cold acetone until crystalline. The acetone mixture was chilled to 0° C., the dye filtered off, washed with acetone and water and finally dried in the air. After recrystalization from methyl alcohol (200 cc. per gram of dye), the dye was obtained, in 54% yield, as green crystals melting with decomposition at 271° to 273° C.

In a similar manner, 5-[(3-ethyl-2(3)-benzoxazolylidene) ethylidene]-2-[(3-ethyl-2(3) - benzoxazolylidene)propenyl]-4(5)-thiazolone ethiodide was obtained, in 20% yield, as minute green crystals, melting with decomposition at 218° to 220° C. Also in a similar manner, 5-[(3-ethyl-2(3) - benzothiazolylidene)ethylidene] - 2 - [(3-ethyl - 2(3)-benzothiazolylidene)propenyl]-4(5)-thiazolone ethiodide was obtained, in 38% yield as minute greenish-bronze crystals, melting with decomposition at 273° to 274° C.

EXAMPLE 6.—5 - (3 - ethyl - 2(3) - benzothiazolylidene) - 2 - [5 - (ethyl - 2(3) - benzothiazolylidene) - 1,3 - pentadienyl] - 4(5) - thiazolone ethiodide

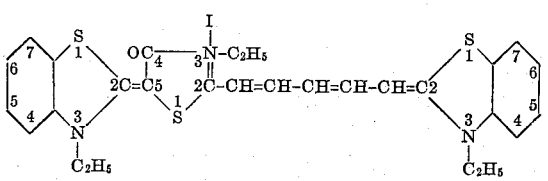

2.16 g. (1 mol.) of 5-(3-ethyl-2(3)-benzothiazolylidene)-2-methyl-4 (5)-thiazolone ethiodide and 2.4 g. (1 mol.) of 2-(4-acetanilido-1,3-butadienyl)-benzothiazole ethiodide were placed in 15 cc. of pyridine. The mixture was boiled, under reflux, for 5 minutes. The resulting blue mixture was chilled to 0° C. The dark blue dye which separated was filtered off, washed with water, then with acetone and finally dried in the air. After recrystallization from methyl alcohol (1250 cc. per gram of dye), the dye was obtained, in 50% yield, as green crystals, having a golden reflex and melting with decomposition at 239° to 241° C.

In a similar manner, 5-(3-ethyl-2(3)-benzothiazolylidene)- 2-[3-ethyl-2(3)-benzothiazolylidene)propenyl]-4(5)-thiazolone ethiodide was obtained, in 46% yield, as minute green crystals, melting with decomposition at 287° to 288° C.

My new intermediates can be condensed, to give polymethine dyes, with dialkylamino-benzaldehydes, dialkylaminocinnamic aldehydes and pyrrole aldehydes. The condensations are advantageously effected, in the presence of a water-binding agent, such as acetic anhydride. Some of these dyes are of use as filter dyes in photographic silver halide emulsions, inasmuch as they are bleached by the usual photographic developers, such as Eastman Kodak Co.'s "D-76." The following examples will serve to illustrate these dyes.

EXAMPLE 7.—2 - (p - dimethylaminostyryl) - 5 - [(3 - ethyl - 2(3) - benzoxazolylidene) - ethylidene]-4(5)-thiazolone ethiodide

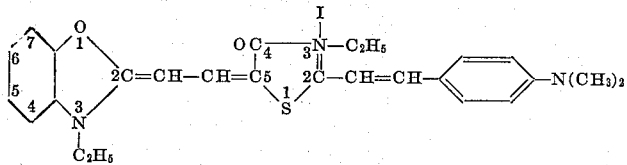

1.0 g. (1 mol.) of 5-[(3-ethyl-2(3)-benzoxazolylidene)ethylidene] - 2-methyl-4-(5)-thiazolone ethiodide and 0.33 w. (1 mol.) of p-dimethylamino-benzaldehyde were placed in 15 cc. of acetic anhydride. The mixture was boiled, under reflux, for one hour. The dye separated from the hot mixture. The mixture was chilled to 0° C., the dye filtered off, washed with acetone and dried in the air. After recrystallization from methyl alcohol (320 cc. per gram of dye), the dye was obtained, in 38% yield, as felted green crystals, melting with decomposition at 260° to 262° C. The dye gave a blue solution in methyl alcohol and was bleached by Eastman Kodak's D-76 developer to a pale yellow.

In a similar manner, 2-(p-dimethylaminostyryl) - 5 - (3 - ethyl - 2,(3) - benzothiazolylidene)-4(5)-thiazolone ethiodide was obtained, in 64% yield, as minute dark green crystals, melting with decomposition at 281° to 282° C. The dye gave a blue solution in methyl alcohol and was bleached by Eastman Kodak's D-76 developer.

Also in a similar manner, 2-[4(p-dimethylaminophenyl) - 1,3 - butadienyl] - 5 - (3 - ethyl - 2(3) - benzothiazolylidene) - 4(5) - thiazolone ethiodide was obtained, in 61% yield, as bright green crystals, melting with decomposition at 262° to 264° C. The dye gave a blue solution in methyl alcohol and was bleached by Eastman Kodak's D-76 developer.

Also in a similar manner, 5-(3-ethyl-2(3)-benzothiazolylidene) - 2 - [β - (1 - heptyl - 2,5 - dimethyl - 3 - pyrryl)vinyl] - 4(5) - thiazolone n-propyl chloride was obtained from 1-heptyl-2,5-dimethyl-3-pyrrole aldehyde, in 25% yield, as green crystals melting with decomposition at 184° to 185° C. The dye gave a bluish red solution in methyl alcohol and was bleached by Eastman Kodak's D–76 developer.

Also in a similar manner, 5-(3-ethyl-2(3)-benzothiazolylidene) - 2 - [β - (1 - lauryl - 2,5 - dimethyl - 3 - pyrryl) vinyl] - 4(5) - thiazolone n-propyl chloride was obtained from 1-lauryl-2,5-dimethyl-3-pyrrole aldehyde, in 52% yield as green crystals melting at 157° to 159° C. with decomposition. The dye gave a bluish red solution in methyl alcohol and was bleached by Eastman Kodak's D-76 developer.

My new intermediates can also be condensed with diarylformamidines to give more complex intermediates which, in turn, can be employed to prepare polymethine dyes. The following examples will serve to illustrate the formation of these new intermediates.

EXAMPLE 8.—2-(β-acetanilidovinyl)-5-[(3-ethyl-2(3)-benzothiazolylidene) ethylidene]-4(5)-thiazone ethiodide

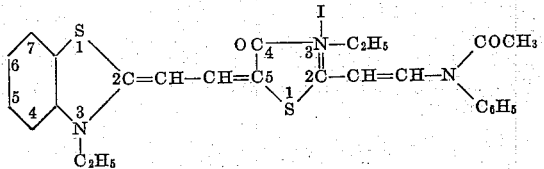

2.2 g. (1 mol.) of 5-[(3-ethyl-2-(3)-benzothiazolylidene) ethylidene]-2-methyl-4(5)-thiazolone ethiodide and 0.94 g. (1 mol.) of diphenylformamidine were placed in 15 cc. of acetic anhydride. The resulting mixture was boiled, under reflux, for 10 minutes. The intermediate separated from the boiling reaction mixture. The mixture was chilled, the intermediate filtered off, washed with acetone and dried in the air. The dark blue crystals thus obtained, in 69% yield, melted at 260° to 262° C. with decomposition.

In a similar manner, 2-(β-acetanilidovinyl)-5-(3-ethyl-2(3)-benzothiazolylidene)-4(5)-thiazolone ethiodide was obtained, in 60% yield, as dull blue crystals, melting at 285° to 288° C. with decomposition.

The following examples illustrate the formation of polymethine dyes from the above intermediates.

EXAMPLE 9.—3-ethyl-5-[(3-ethyl-2(3)-benzothiazolylidene) ethylidene] - 2-[(3-ethyl-4-oxo-2-thiono-5-thiazolidylidene) ethylidene]-4- thiazolidone

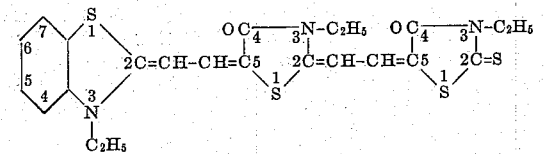

1.5 g. (1 mol.) of 2-(β-acetanilidovinyl)-5-[(3 - ethyl - 2(3) - benzothiazolylidene) ethylidene]-4(5)-thiazolone ethiodide, 0.4 g. (1 mol.) of 3-ethylrhodanine and 0.25 g. (1 mol.) of triethylamine were placed in 25 cc. of acetic anhydride. The mixture was boiled, under reflux, for one minute. Green crystals of dye separated from the boiling mixture. These were filtered off and recrystallized several times from glacial acetic acid (600 cc. per gram of dye). The dye was obtained, in 15% yield, as minute green crystals, melting with decomposition at 291° to 293° C.

In a similar manner, 3-ethyl-5-(3-ethyl-2(3)-benzothiazolylidene)-2-[(3-ethyl-4-oxo-2-thiono-5-thiazolidylidene) ethylidene]-4-thiazolidone was obtained from 2-(β-acetanilidovinyl)-5-(3-ethyl-2(3)-benzothiazolylidene)-4(5)-thiazolone ethiodide, in 67% yield, as bronze crystals, melting above 300° C.

My new intermediates can also be condensed with β-alkoxy-acrolein acetals, in glacial acetic acid, to give more complex intermediates, as shown in the following example.

EXAMPLE 10.—2-(4-ethoxy-1,3-butadienyl)-5-(3-ethyl-2(3)-benzothiazolylidene)-4(5) - thiazolone ethiodide

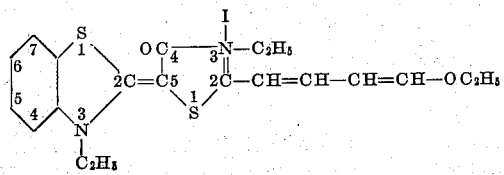

16.7 g. (1 mol.) of 5-(3-ethyl-2(3)-benzothiazolylidene)-2-methyl-4(5)-thiazolone ethiodide and 13.6 g. (1 mol.) of β-ethoxyacrolein acetal were placed in 100 cc. of glacial acetic acid and heated, with stirring, on the steam bath. Coppery crystals separated from the hot mixture. The mixture was chilled to 0° C., the intermediate filtered off, washed with acetone and dried in the air. It melted at 237° to 240° C. with decomposition. Yield 80%.

From intermediates such as the above, polymethine dyes can be obtained by condensation with cyclammonium quaternary salts containing a reactive methyl group. The condensations are advantageously effected in acetic anhydride containing a trialkylamine. The following examples illustrate the formation of such dyes.

EXAMPLE 11.— 5-(3-ethyl-2(3)-benzothiazolylidene) - 2 - [5(1-ethyl-2(1)-quinolylidene)1,3-pentadienyl]-4(5)-thiazolone ethiodide

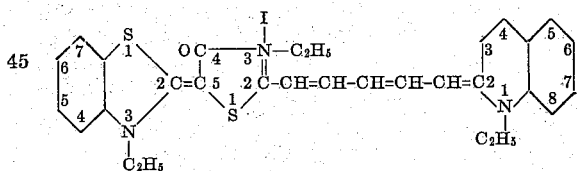

1.71 g. (1 mol.) of 2-(4-ethoxy-1,3-butadienyl)-5-(3-ethyl-2(3)-benzothiazolylidene)-4(5)-thiazolone ethiodide and 1.0 g. (1 mol.) of quinaldine ethiodide were placed in 25 cc. of acetic anhydride containing 0.35 g. (1 mol.) of triethylamine. The mixture was boiled, under reflux, for one minute. The dye separated from the boiling solution. The reaction mixture was chilled, the dye filtered off, washed with acetone, then with water and dried in the air. After recrystallization from methyl alcohol (640 cc. per gram of dye), the dye was obtained, in 33% yield, as minute coppery crystals, melting at 240° to 242° C. with decomposition.

In a similar manner, the corresponding 4(1)-quinolylidene dye was obtained, in 33% yield, as minute coppery crystals, melting with decomposition at 231° to 233° C.

In a similar manner, 3-ethylrhodanine was condensed with the same intermediate to give 3-ethyl-5-(3-ethyl-2(3)-benzothiazolylidene)-2-[4-(3-ethyl-4-oxo-2-thiono-5-thiazolidylidene)-2-butenylidene]-4-thiazolidone, in 39% yield, as green crystals melting with decomposition at 286° to 288° C.

The same intermediate was also condensed, in acetic anhydride, with 1-ethyl-2,5-dimethyl pyrrole to give 5-(3-ethyl-2-(3)-benzothiazolylidene)-2-[4-(1-ethyl-2,5-dimethyl-3-pyrryl)-1,3-butadienyl]-4(5)-thiazolone ethiodide, in 30% yield, as green crystals melting with decomposition at 247° to 249° C. The dye gave a blue methyl alcoholic solution and was bleached by Eastman Kodak's D-76 developer.

The polymethine dyes obtainable from my intermediates are not of any particular use as sensitizers for photographic silver halide emulsions, showing, at best, only a weak sensitizing action. The dyes, especially those which are bleached by the ordinary developers, are of use as filter dyes.

What I claim as my invention and desire to be secured by Letters Patent of the United States is:

1. A polymethine dye intermediate of the following general formula:

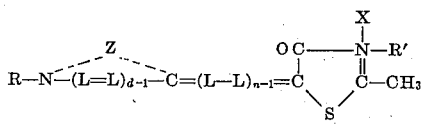

wherein L represents a methine group, $d$ represents a positive integer of from one to two, $n$ represents a positive integer of from one to three, R represents an alkyl group, R' represents a member selected from the group consisting of alkyl and aryl groups, X repersents an acid radical and Z represents the non-metallic atoms necessary to complete a heterocyclic organic nucleus.

2. A polymethine dye intermediate of the following general formula:

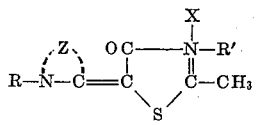

wherein R represents an alkyl group, R' represents a member selected from the group consisting of alkyl and aryl groups, X represents an acid radical, and Z represents the non-metallic atoms necessary to complete a heterocyclic organic nucleus.

3. A polymethine dye intermediate of the following general formula:

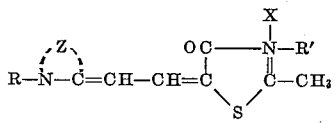

wherein R represents an alkyl group, R' represents a member selected from the group consisting of alkyl and aryl groups, X represents an acid radical, and Z represents the non-metallic atoms necessary to complete a heterocyclic organic nucleus.

4. A polymethine dye intermediate of the following general formula:

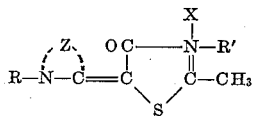

wherein R represents an alkyl group, R' represents a member selected from the group consisting of alkyl and aryl groups, X represents an acid radical, and Z represents the non-metallic atoms necessary to complete a benzothiazole nucleus.

5. A polymethine dye intermediate of the following general formula:

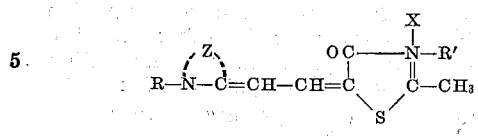

wherein R represents an alkyl group, R' represents a member selected from the group consisting of alkyl and aryl groups, X represents an acid radical, and Z represents the non-metallic atoms necessary to complete a benzothiazole nucleus.

6. A polymethine dye intermediate of the following general formula:

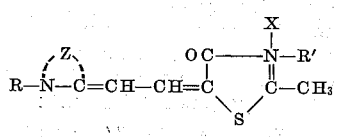

wherein R represents an alkyl group, R' represents a member selected from the group consisting of alkyl and aryl groups, X represents an acid radical and Z represents the non-metallic atoms necessary to complete a benzoxazole nucleus.

7. 5-(3-ethyl - 2(3) - benzothiazolylidene)-2-methyl-4(5)-thiazolone ethiodide.

8. 5-[(3-ethyl-2(3)-benzoxazolylidene) ethylidene]-2-methyl-4(5)-thiazolone ethiodide.

9. 5-[(3-ethyl-2(3)-benzothiazolylidene) ethylidene]-2-methyl-4(5)-thiazolone ethiodide.

10. A process for preparing a polymethine dye intermediate comprising hydrolyzing in the presence of an acid, a condensation product of the following general formula:

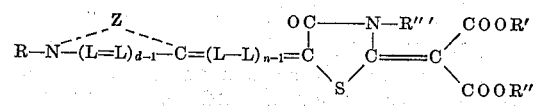

wherein L represents a methine group, $d$ represents a positive integer of from one to two, $n$ represents a positive integer of from one to three, R, R' and R'' each represent an alkyl group, R''' represents a member selected from the group consisting of alkyl and aryl groups, and Z represents the non-metallic atoms necessary to complete a heterocyclic organic nucleus.

11. A process for preparing a polymethine dye intermediate comprising hydrolyzing, in the presence of hydrochloric acid, a condensation product of the following general formula:

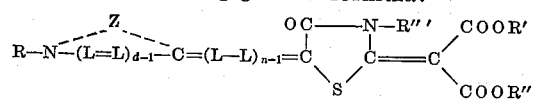

wherein L represents a methine group, $d$ represents a positive integer of from one to two, $n$ represents a positive integer of from one to three, R, R' and R'' each represent an alkyl group, R''' represents a member selected from the group consisting of alkyl and aryl groups, and Z represents the non-metallic atoms necessary to complete a heterocyclic organic nucleus.

12. A process for preparing a polymethine dye intermediate comprising hydrolyzing, in the presence of hydrochloric acid, a condensation product of the following general formula:

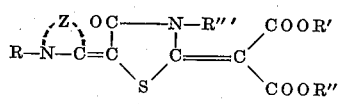

wherein R, R' and R'' each represent an alkyl group, R''' represents a member selected from the group consisting of alkyl and aryl groups and Z represents the non-metallic atoms necessary to complete a heterocyclic organic nucleus.

13. A process for preparing a polymethine dye intermediate comprising hydrolyzing, in the presence of hydrochloric acid, a condensation product of the following general formula:

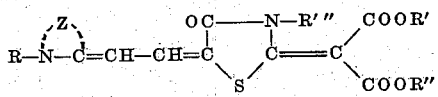

wherein R, R' and R" each represent an alkyl group, R''' represents a member selected from the group consisting of alkyl and aryl groups, and Z represents the non-metallic atoms necessary to complete a heterocyclic nucleus.

14. A process for preparing a polymethine dye intermediate comprising hydrolyzing, in the presence of hydrochloride acid, a condensation product of the following general formula:

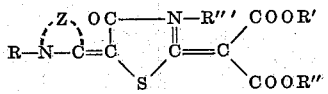

wherein R, R' and R" each represent an alkyl group, R''' represents a member selected from the group consisting of alkyl and aryl groups and Z represents the non-metallic atoms necessary to complete a benzothiazole nucleus.

15. A process for preparing a polymethine dye intermediate comprising hydrolyzing, in the presence of hydrochloric acid, a condensation product of the following general formula:

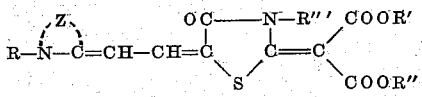

wherein R, R' and R" each represent an alkyl group, R''' represents a member selected from the group consisting of alkyl and aryl groups and Z represents the non-metallic atoms necessary to complete a heterocyclic nucleus.

16. A process for preparing a polymethine dye intermediate comprising hydrolyzing, in the presence of hydrochloric acid, a condensation product of the following general formula:

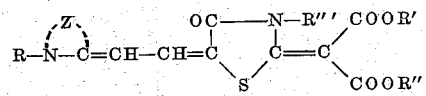

wherein R, R' and R" each represent an alkyl group, R''' represents a member selected from the group consisting of alkyl and aryl groups, and Z represents the non-metallic atoms necessary to complete a benzoxazole nucleus.

17. A process for preparing a polymethine dye intermediate comprising hydrolyzing, in the presence of hydrochloric acid, a condensation product of the following general formula:

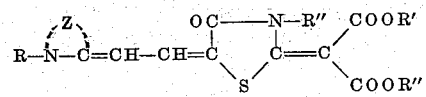

wherein R, R' and R" each represent an alkyl group, R''' represents a member selected from the group consisting of alkyl and aryl groups, and Z represents the non-metallic atoms necessary to complete a benzothiazole nucleus.

18. A process for preparing a polymethine dye intermediate comprising hydrolyzing, in the presence of hydrochloric acid, a condensation product of the following general formula:

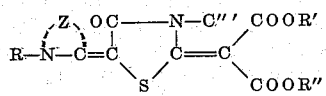

wherein R, R' and R" each represent an alkyl group, R''' represents a member selected from the group consisting of alkyl and aryl groups, and Z represents the non-metallic atoms necessary to complete a benzothiazole nucleus.

ROBERT H. SPRAGUE.